United States Patent
Wellington et al.

(10) Patent No.: US 10,713,917 B1
(45) Date of Patent: Jul. 14, 2020

(54) VEHICLE WITH ABANDONED OCCUPANT ALERT

(71) Applicants: Audra L. Wellington, Watauga, TX (US); Leslie B. Hallgren, Watauga, TX (US)

(72) Inventors: Audra L. Wellington, Watauga, TX (US); Leslie B. Hallgren, Watauga, TX (US)

( * ) Notice: Subject to any disclaimer, the term of this patent is extended or adjusted under 35 U.S.C. 154(b) by 0 days.

(21) Appl. No.: 16/261,068

(22) Filed: Jan. 29, 2019

Related U.S. Application Data

(60) Provisional application No. 62/623,046, filed on Jan. 29, 2018.

(51) Int. Cl.
| | | |
|---|---|---|
| *G08B 21/02* | (2006.01) | |
| *B60H 1/00* | (2006.01) | |
| *G06K 9/00* | (2006.01) | |
| *B60N 2/00* | (2006.01) | |

(52) U.S. Cl.
CPC ..... *G08B 21/0269* (2013.01); *B60H 1/00742* (2013.01); *B60H 1/00807* (2013.01); *B60N 2/002* (2013.01); *G06K 9/00838* (2013.01); *G08B 21/0205* (2013.01)

(58) Field of Classification Search
CPC combination set(s) only.
See application file for complete search history.

(56) References Cited

U.S. PATENT DOCUMENTS

| | | | |
|---|---|---|---|
| 6,847,302 B2 | 1/2005 | Flanagan et al. | |
| 6,922,147 B1 | 7/2005 | Viksnins et al. | |
| 9,139,128 B1 | 9/2015 | Lemons | |
| 9,550,454 B1 | 1/2017 | Roisen et al. | |
| 2012/0232749 A1* | 9/2012 | Schoenberg | B60N 2/002 701/36 |
| 2013/0106598 A1 | 5/2013 | Silveira | |
| 2015/0274036 A1 | 10/2015 | Arad et al. | |
| 2016/0078737 A1 | 3/2016 | Cohen et al. | |
| 2018/0099592 A1* | 4/2018 | Curry, V | B60N 2/879 |

\* cited by examiner

*Primary Examiner* — Thomas S McCormack
(74) *Attorney, Agent, or Firm* — Cramer Patent & Design, PLLC; Aaron R. Cramer

(57) ABSTRACT

An vehicle with abandoned occupant alert system incorporates a pad having a global positioning tracking device, a radio-frequency identification (RFID) chip, a wireless transmitter, and a temperature gauge. The pad also comprises a heating and cooling mechanism which is activated in response to the interior temperature of the vehicle. The pad is configured to transmit a signal to an electronic device equipped with an application which alerts a user to the presence of an individual of sufficient weight sitting upon the pad in an unoccupied vehicle the engine of which has been shut off.

15 Claims, 3 Drawing Sheets

VEHICLE WITH ABANDONED OCCUPANT ALERT

RELATED APPLICATIONS

The present invention is a continuation of and claims the benefit of U.S. Provisional Application No. 62/623,046, filed Jan. 29, 2018, the entire disclosures of which are incorporated herein by reference.

FIELD OF THE INVENTION

The presently disclosed subject matter is directed to a vehicle with abandoned occupant alert.

BACKGROUND OF THE INVENTION

It is all too often that we learn of a tragedy involving death or serious injury that results from children being locked inside of an automobile on a hot day. Whether the act is accidental, unintentional or just neglectful, the dangers are very real and often result in death for the trapped occupant. Even if the greatest care is taken to never leave a child alone in a car, even the best parent can become distracted or in communication with their spouse or partner can become confused resulting in the child being left behind and locked in a car seat.

The temperatures rise very quickly and in just a short time, permanent injury or death can occur. Accordingly, there is a need for a means by which children trapped in a car seat inside of a motor vehicle passenger compartment can be rescued and/or the temperature of the child adjusted in a quick and safe manner. The development of the abandoned vehicle occupant fulfills this need.

SUMMARY OF THE INVENTION

The principles of the present invention provide for an abandoned vehicle occupant device, comprises a base assembly, a first heating assembly having a plurality of first secured heating coils within the first heating assembly, a second heating assembly having a plurality of second secured heating coils within the second heating assembly, a cooling assembly having a secured cooling means, the first heating assembly and the second heating assembly are disposed on opposite sides of the cooling assembly, a support arm connecting the base assembly with the cooling assembly and a lumen disposed within the base assembly.

The first heating assembly, the second heating assembly, the cooling assembly and the support arm are coextensive and in environmental communication with each other portion of the lumen. Disposed within the lumen of the base assembly is a GPS unit, a microprocessor, a transmitter, a temperature regulator, and an RFID chip/weight sensor, the microprocessor has a transceiver and is in electrical communication with a power supply, the GPS unit, the temperature regulator and the RFID chip/weight sensor are each respectively in electrical communication with the microprocessor.

There is also a first anchor and a second anchor which are disposed in a plurality of conventionally appearing car seat anchors and are in electrical communication with the microprocessor. The first anchor has an integrated first sensor and the second anchor has an integrated second sensor, each obtaining data relative to whether a car seat is properly secured.

Also provided is an application installed on a portable electronic device utilizing the application, the application activates the abandoned vehicle occupant device, the GPS unit, the temperature regulator, the RFID chip/weight sensor, the anchors and the sensors all generate data relative to each the sensor's intended purpose and wirelessly transmit the data to the portable electronic device from the microprocessor via a bidirectional signal transmitted by the transmitter; and an ignition interface provided with the abandoned vehicle occupant device and in electrical communication with the microprocessor.

The first heating assembly and the second heating assembly may form a T-shaped structure. The integrated sensors may act as a plurality of independent antennas for the abandoned vehicle occupant device or act as an alternate power conduit for the abandoned vehicle occupant device.

The ignition interface provides a switching of power on or off to the microprocessor. The electrical wiring, the heating coils and the cooling means, are dependent on whether the vehicle is on to prevent the abandoned vehicle occupant device from draining the power source when the vehicle is off.

The power supply may be an on-board battery of a vehicle or powered by means of a cigarette lighter socket adapter. The heating coils and the cooling means may be in electrical communication with the microprocessor via a plurality of electrical wiring traveling through the support arm. The portable electronic device may be a cell phone. Dependent upon which data is obtained, a user increases or decreases a temperature of the abandoned vehicle occupant device by manipulation of the application through the bidirectional signal.

The abandoned vehicle occupant device is made of durable, flexible material or weather-resistant material. The abandoned vehicle occupant device may be secured beneath a plurality of padding of the car seat.

A method for monitoring a plurality of vitality data of an occupant of a car seat through an abandoned vehicle occupant device, comprising the steps of transmitting the vitality data of the occupant of the car seat to a portable electronic device; rendering the vitality data accessible via an application installed upon the portable electronic device; and manipulating the application to send a signal from the portable electronic device and to control various components of the abandoned vehicle occupant device. The vitality data includes temperature and may be transmitted by a bi-directional signal.

BRIEF DESCRIPTION OF THE DRAWINGS

The advantages and features of the present invention will become better understood with reference to the following more detailed description and claims taken in conjunction with the accompanying drawings, in which like elements are identified with like symbols, and in which:

Figure 1:
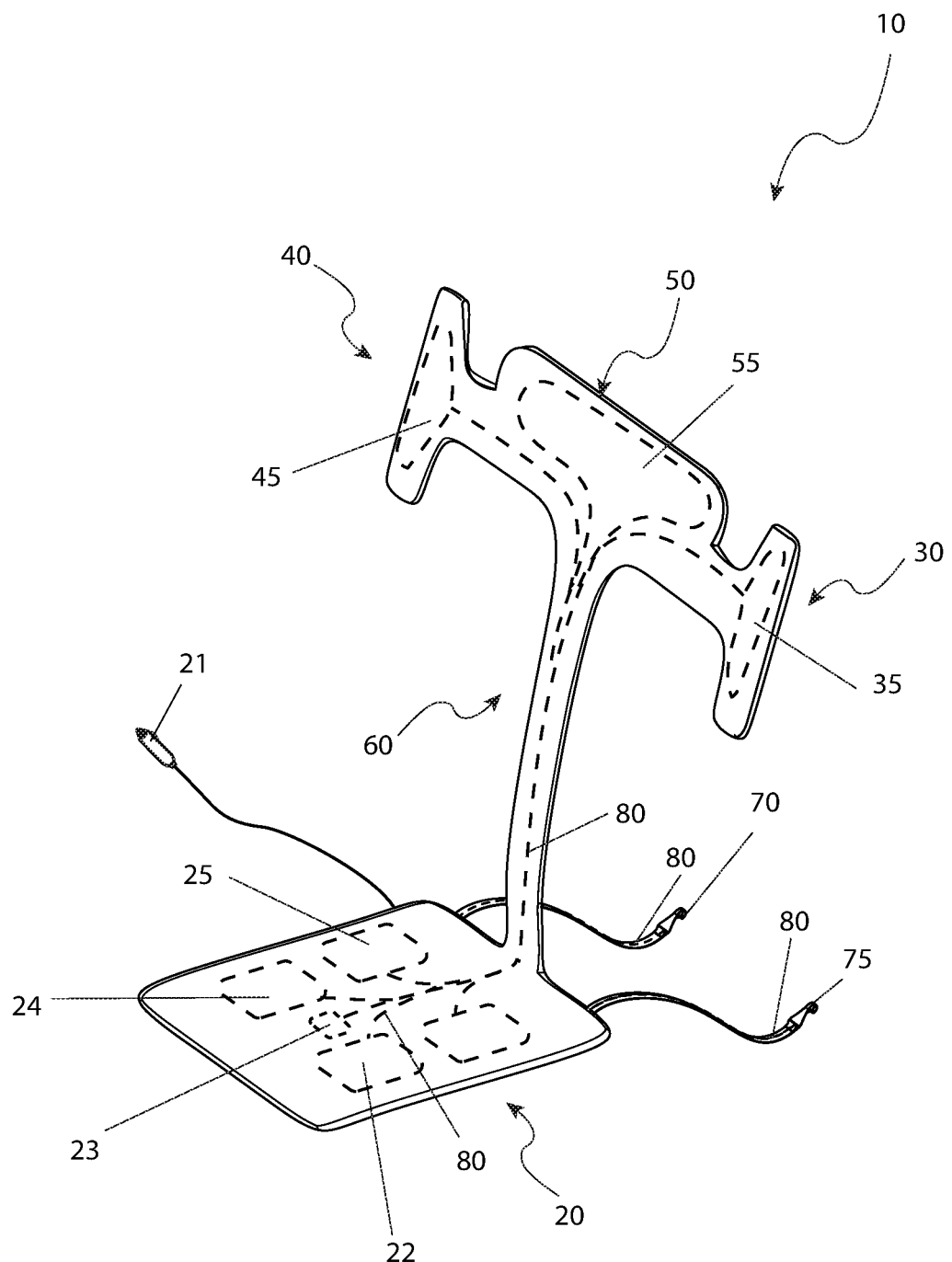
FIG. 1 is a perspective view of an abandoned vehicle occupant device 10, according to a preferred embodiment of the present invention.

DESCRIPTIVE KEY 10 abandoned vehicle occupant device
20 base assembly 21 power supply
22 GPS unit
23 microprocessor
24 temperature regulator
25 RFID chip/weight sensor
26 ignition interface
30 first heating assembly
35 first heating coil
40 second heating assembly
45 second heating coil
50 cooling assembly
55 cooling means
60 support arm
70 first anchor
72 first anchor sensor
75 second anchor
77 second anchor sensor
80 electrical wiring
100 car seat
105 portable electronic device
107 transmitter
110 bidirectional first signal

1. DESCRIPTION OF THE INVENTION

Figure 2:
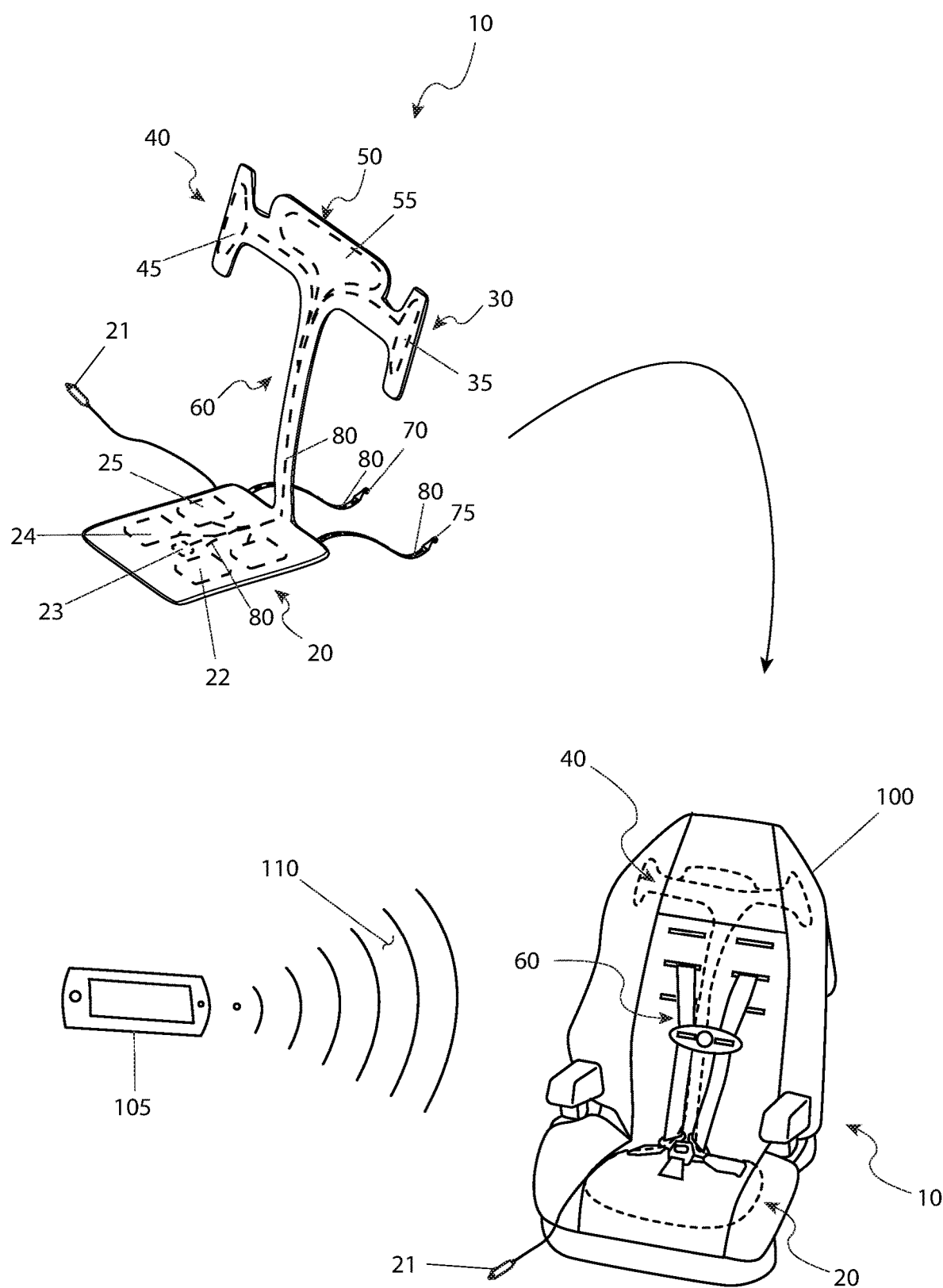
FIG. 2 is a perspective environmental view of the abandoned vehicle occupant device 10, according to the preferred embodiment of the present invention; and, FIG. 3 is an electrical schematic of the abandoned vehicle occupant device 10, according to the preferred embodiment of the present invention.

Referring to FIGS. 1 and 2, disclosing an abandoned vehicle occupant device, herein generally referred to as a device 10. The disclosed device 10 provides a user the ability to monitor the presence and other vitality data such as temperature of an occupant (not shown) of a car seat 100 through a plurality of sensors 22, 24, 25, 72 and 77 (as will be discussed more fully below). The presence and vitality data of an occupant is transmitted to a portable electronic device 105 by a bi-directional signal 110. The data contained therein is rendered accessible via an application capable of being installed upon the portable electronic device 105. A user may then manipulate the application to send a bidirectional signal 110 from the portable electronic device 105 and control various components of the device 10.

Referring now to FIG. 1, a perspective view of an abandoned vehicle occupant device 10, according to a preferred embodiment of the present invention is disclosed. The device 10, comprises a durable, flexible, weather-resistant material having a lumen (not shown) within each portion defining an interior space. The device 10, further comprises a base assembly 20, a first heating assembly 30, a second heating assembly 40, a cooling assembly 50 and a support arm 60. The support arm 60 connects the base assembly 20 with the cooling assembly 50. The first heating assembly 30 and second heating assembly 40 are disposed on opposite sides of the cooling assembly 50 forming a "T"-shaped structure. The aforementioned lumen is disposed within the base assembly 20, the first heating assembly 30, the second heating assembly 40, the cooling assembly 50 and the support arm 60 with each portion of the lumen being coextensive and in environmental communication with each other portion of the lumen.

Disposed within the lumen of the base assembly 20, a GPS unit 22, a microprocessor 23, a transmitter 107, a temperature regulator 24, and an RFID chip/weight sensor. The microprocessor 23 has a transceiver and is in electrical communication with a power supply 21 while the GPS unit 22, temperature regulator 24 and RFID chip/weight sensor are each respectively in electrical communication with the microprocessor 23. The microprocessor 23 is capable of being in electrical communication with a power source, such as an on-board battery of a vehicle, via the power supply 21.

Figure 3:
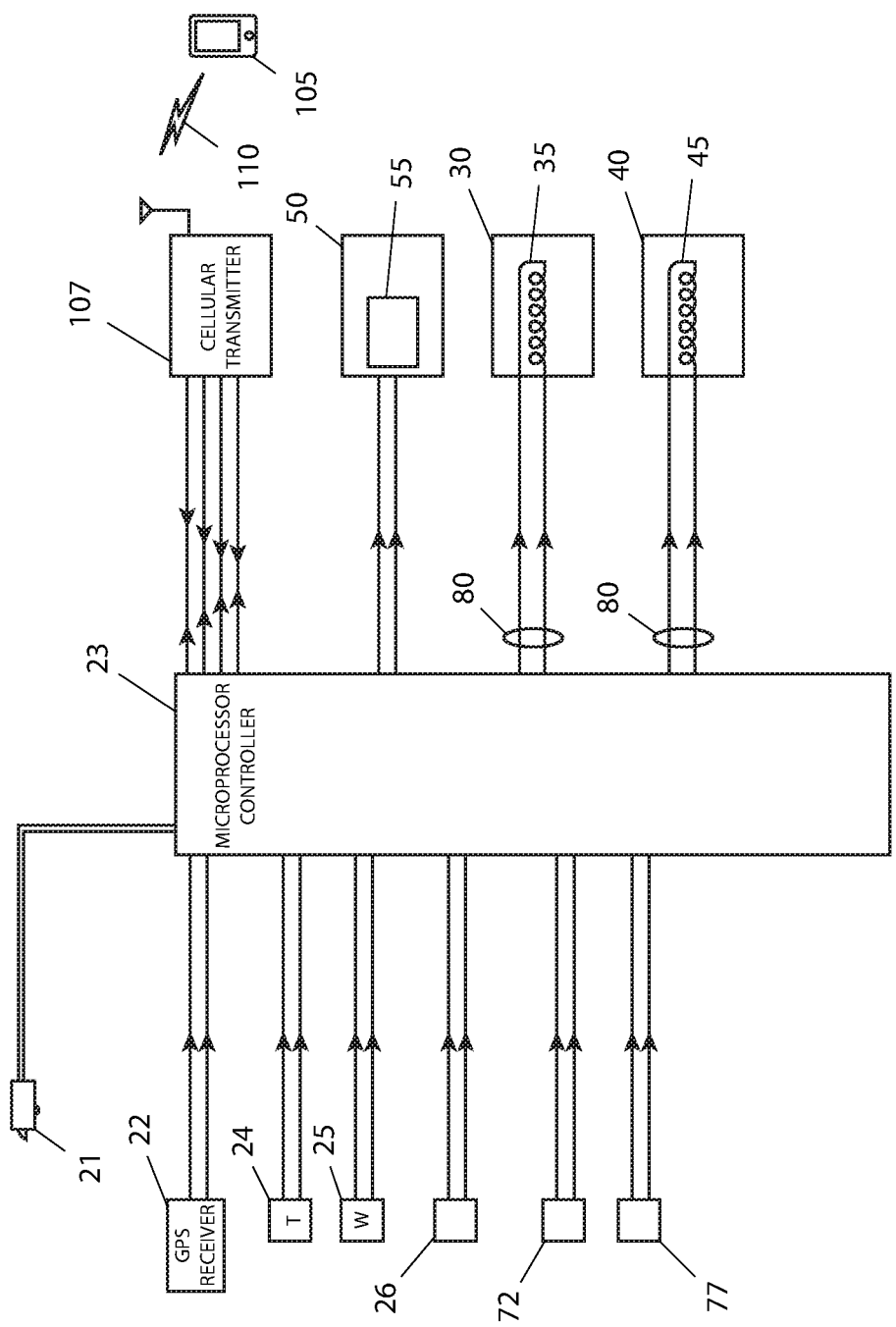

Such a power supply 21, in an exemplary embodiment, can be accomplished with a cigarette lighter socket adapter. This description is best shown in FIG. 3.

Within the cooling assembly 50 is secured a cooling means 55. Within each heating assembly 30, 40 are respectively secured heating coils 35, 45 respectively. The heating coils 35, 40 and cooling means 55 are in electrical communication with the microprocessor 23 via electrical wiring 80 traveling through the support arm 60.

The first anchor 70 and second anchor 75 are disposed in conventionally appearing car seat 100 anchors and are in electrical communication with the microprocessor 23. A first anchor 70 has an integrated first sensor 72 and a second anchor 75 has an integrated second sensor 77, each capable of obtaining data relative to whether the car seat 100 is properly secured, act as independent antennas or act as an alternate power conduit for the device 10.

Referring now to FIG. 2, a perspective environmental view of the abandoned vehicle occupant device 10, according to the preferred embodiment of the present invention is disclosed. This view illustrates the preferred manner in which the device 10 is secured beneath the padding of a traditional five-point restraint car seat 100. This view also highlights the ideal interaction between the bidirectional signal 110 generated and received by the portable electronic device 105 and the transmitter 107 of the device 10.

The use of the disclosed device 10 provides the ability to monitor and protect an occupant of a car seat 100 when a user procures the device 10 and installs the same under the padded portion of a car seat 100. The user must also download and install the application to portable electronic device 105 capable of utilizing the application. The user may then activate the device 10 and place a child or other similarly sized individual into the car seat 100. The GPS unit 22, the temperature regulator 24, the RFID chip/weight sensor 25, the anchors 70, 75, and the sensors 72, 77 all generate data relative to each sensor's (22, 24, 25, 72, 77 intended purpose and wirelessly transmit the same to the portable electronic device 105 from the microprocessor 23 via a bidirectional signal 110 transmitted by the transmitter 107. Depending on the data obtained, the user may increase or decrease the temperature of the device 10 by manipulation of the application through the bidirectional signal 110. The user may also track the device 10 on the portable electronic device 105 by the GPS unit 22 should the user and device 10 become separated.

An ignition interface 26 is also provided with the device 10, and in electrical communication with the microprocessor 23. The ignition interface 26 provides a switching of power on or off to the microprocessor 23, and hence the electrical wiring 80 the heating coils 35, 45, and cooling means 55, dependent on if the vehicle is on. This is to prevent the device 10 from draining the on-board battery (i.e. power source) 21 if the power supply 21 is connected when the vehicle is off.

The materials required to produce the disclosed device 10 are all readily available and well known to manufacturers of goods of this type. The raw materials as used in manufacture of the disclosed device 10 may best be obtained from wholesalers and manufacturers that deal in goods of that nature and assembled at a final location.

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated.

What is claimed is:

1. An abandoned vehicle occupant device, comprising:
   a base assembly;
   a first heating assembly having a plurality of first secured heating coils within said first heating assembly;
   a second heating assembly having a plurality of second secured heating coils within said second heating assembly;
   a cooling assembly having a secured cooling means, said first heating assembly and said second heating assembly are disposed on opposite sides of said cooling assembly;
   a support arm connecting said base assembly with said cooling assembly; and
   a lumen disposed within said base assembly, said first heating assembly, said second heating assembly, said cooling assembly and said support arm with each portion of said lumen being coextensive and in environmental communication with each other portion of said lumen, disposed within said lumen of said base assembly is a GPS unit, a microprocessor, a transmitter, a temperature regulator, and an RFID chip/weight sensor, said microprocessor has a transceiver and is in electrical communication with a power supply, said GPS unit, said temperature regulator and said RFID chip/weight sensor are each respectively in electrical communication with said microprocessor;
   a first anchor and a second anchor disposed in a plurality of conventionally appearing car seat anchors and are in electrical communication with said microprocessor, said first anchor has an integrated first sensor and said second anchor has an integrated second sensor, each obtaining data relative to whether a car seat is properly secured;
   an application installed on a portable electronic device utilizing said application, said application activates said abandoned vehicle occupant device, said GPS unit, said temperature regulator, said RFID chip/weight sensor, said anchors and said sensors all generate data relative to each said sensor's intended purpose and wirelessly transmit said data to said portable electronic device from said microprocessor via a bidirectional signal transmitted by said transmitter; and
   an ignition interface provided with said abandoned vehicle occupant device and in electrical communication with said microprocessor.

2. The abandoned vehicle occupant device according to claim 1, wherein said first heating assembly and said second heating assembly form a T-shaped structure.

3. The abandoned vehicle occupant device according to claim 1, wherein said integrated sensors act as a plurality of independent antennas for said abandoned vehicle occupant device.

4. The abandoned vehicle occupant device according to claim 1, wherein said integrated sensors act as an alternate power conduit for said abandoned vehicle occupant device.

5. The abandoned vehicle occupant device according to claim 1, wherein said ignition interface provides a switching of power on or off to said microprocessor.

6. The abandoned vehicle occupant device according to claim 5, wherein said electrical wiring said heating coils and said cooling means, dependent on if said vehicle is on to prevent said abandoned vehicle occupant device from draining said power source when said vehicle is off.

7. The abandoned vehicle occupant device according to claim 1, wherein said power supply is an on-board battery of a vehicle.

8. The abandoned vehicle occupant device according to claim 7, wherein said power supply is accomplished with a cigarette lighter socket adapter.

9. The abandoned vehicle occupant device according to claim 1, wherein said heating coils and said cooling means are in electrical communication with said microprocessor via a plurality of electrical wiring traveling through said support arm.

10. The abandoned vehicle occupant device according to claim 1, wherein said portable electronic device is a cell phone.

11. The abandoned vehicle occupant device according to claim 1, wherein depending on said data obtained, a user increases or decreases a temperature of said abandoned vehicle occupant device by manipulation of said application through said bidirectional signal.

12. The abandoned vehicle occupant device according to claim 1, wherein said abandoned vehicle occupant device is made of durable material.

13. The abandoned vehicle occupant device according to claim 1, wherein said abandoned vehicle occupant device is made of flexible material.

14. The abandoned vehicle occupant device according to claim 1, wherein said abandoned vehicle occupant device is made of weather-resistant material.

15. The abandoned vehicle occupant device according to claim 1, wherein said abandoned vehicle occupant device is secured beneath a plurality of padding of said car seat.

* * * * *